US012073677B2

(12) United States Patent
Berendes

(10) Patent No.: US 12,073,677 B2
(45) Date of Patent: Aug. 27, 2024

(54) VALUE NOTE BOX

(71) Applicant: Wincor Nixdorf International GmbH, Paderborn (DE)

(72) Inventor: Elmar Berendes, Warburg (DE)

(73) Assignee: Diebold Nixdorf Systems GmbH, Paderborn (DE)

( * ) Notice: Subject to any disclaimer, the term of this patent is extended or adjusted under 35 U.S.C. 154(b) by 0 days.

(21) Appl. No.: 17/886,438

(22) Filed: Aug. 11, 2022

(65) Prior Publication Data

US 2023/0230436 A1 Jul. 20, 2023

Related U.S. Application Data

(63) Continuation of application No. 16/872,511, filed on May 12, 2020, now Pat. No. 11,521,453.

(30) Foreign Application Priority Data

May 13, 2019 (EP) .................................... 19173983

(51) Int. Cl.
*B65H 29/60* (2006.01)
*G07D 11/125* (2019.01)
*G07D 11/13* (2019.01)

(52) U.S. Cl.
CPC ............ *G07D 11/13* (2019.01); *B65H 29/60* (2013.01); *G07D 11/125* (2019.01)

(58) Field of Classification Search
CPC ........ G07D 11/13; B65H 29/60; B65H 29/40; B65H 31/24
See application file for complete search history.

(56) References Cited

U.S. PATENT DOCUMENTS

| | | | | |
|---|---|---|---|---|
| 5,013,023 A * | 5/1991 | Hashimoto | ............ | B65H 31/24 271/902 |
| 8,485,432 B2 * | 7/2013 | Holland-Letz | ......... | B65H 1/022 235/383 |
| 2007/0228152 A1 * | 10/2007 | Washington | ............ | G07F 19/20 235/379 |

FOREIGN PATENT DOCUMENTS

| | | | |
|---|---|---|---|
| DE | 04008973 | C1 | 7/1991 |
| DE | 202007018498 | U1 | 11/2008 |
| DE | 102009017220 | A1 | 10/2010 |
| WO | 2004061787 | A2 | 7/2004 |

* cited by examiner

*Primary Examiner* — Howard J Sanders
(74) *Attorney, Agent, or Firm* — Black McCuskey

(57) ABSTRACT

A value note box has a first storage compartment for storing notes of value as well as at least a second storage compartment for storing notes of value. Further, the value note box comprises a switch unit for selectively feeding notes of value into the first storage compartment or into the second storage compartment. The switch unit comprises a switch element, a portion of which delimits one side of the first storage compartment.

4 Claims, 6 Drawing Sheets

VALUE NOTE BOX

This application is a continuation application of application Ser. No. 16/872,511 for a Value note box, filed on 2020 May 12, which is hereby incorporated by reference in its entirety.

The invention relates to a value note box having a first storage compartment for storing notes of value and at least a second storage compartment for storing notes of value, which box comprises a switch unit for selectively feeding notes of value into the first or into the second storage compartment.

The invention is in particular used in connection with automated teller machines, in which notes of value, preferably banknotes, are deposited and/or from which notes of value are dispensed. Automated teller machines usually comprise a first value note box in which notes of value are deposited that had been provided to a user for withdrawal in an output compartment but had not been removed by the user. Further, known automated teller machines have a second value note box for storing notes of value that are suspected to be counterfeit, and a third value note box for storing sorted-out notes of value. Further, from document DE 10 2009 017220 A1, value note boxes with three separate storage compartments are known.

An alternative possibility for storing sorted-out notes of value, notes of value that are suspected to be counterfeit and notes of value that have not been removed is to store sorted-out notes of value as well as the notes of value that are suspected to be counterfeit and the notes of value that have not been removed in a value note box having only one storage compartment.

This has the disadvantage that when this box is emptied by a cash-in-transit company, the notes of value have to be sorted by the cash-in transit company into sorted-out notes of value, notes of value that are suspected to be counterfeit and notes of value that have not been removed. This involves considerable additional expenses. Further, the sorting of the notes of value might not be possible or only with great difficulty.

From document DE 20 2007 018 498 U1, an automated teller machine for the output of banknotes with at least one banknote storage, a pull-off and separating device, an output compartment and a device for storing banknotes that have not been removed in the form of a drum storage is known.

It is the object of the invention to specify a value note box having a compact structure and in which notes of value may be stacked separately.

This object is solved by a device having the features of claim 1. Advantageous developments of the invention are specified in the dependent claims.

Due to the fact that the value note box comprises two storage compartments, it is achieved that different notes of value, in particular notes of value that are assigned to different value note classes, may be stored spatially separated from each other. By means of the switch unit, an easy selective feeding of notes of value into the first or the second storage compartment is possible. Due to the fact that at least one side of the first storage compartment is delimited by a portion of the switch element, a compact space-saving structure of the value note box is possible. The value note box is in particular insertable into a device for handling notes of value and removable therefrom. The device for handling notes of value is in particular an automated teller machine, an automatic POS system or an automated teller safe. The notes of value to be stored in the value note box in the first storage compartment are in particular notes of value that have not been removed from the output compartment of the device for handling notes of value, i.e. notes of value of a first value note class. The notes of value to be stored in the value note box in the second storage compartment are in particular notes of value that are suspected to be counterfeit or counterfeit notes of value, i.e. notes of value of a second value note class.

It is particularly advantageous when the portion of the switch element serves as a separating element between the first storage compartment and the second storage compartment. In particular, the portion of the switch element may serve as a delimiting wall of the first storage compartment and at the same time as a delimiting wall of the second storage compartment. As a result, a simple and compact structure of the value note box is achieved.

Further, it is advantageous when in a first switch position for feeding notes of value fed to the value note box into the first storage compartment, the switch element is arranged in a first position, and when in a second switch position for feeding notes of value fed to the value note box into the second storage compartment, the switch element is arranged in a second position. As a result, the notes of value may be fed to the value note box in particular via one single feed slot and then, with the aid of the switch element, be fed to the defined storage compartment by a corresponding activation of the switch element via a drive unit preferably arranged outside the value note box.

Here, it is advantageous when the first storage compartment is smaller in the second position of the switch element than in the first position of the switch element. As a result, in particular a free feeding area for feeding a further note of value into the second storage compartment can be created. Further, a compression of the value note stack stored in the first storage compartment is thus possible so that during a subsequent reset of the switch element into the first position a feeding area into which a further note of value may be transported may be created in the first storage compartment also when a value note stack is present in the first storage compartment. This prevents value note jams. Further, the storage capacity of the first storage compartment may even be utilized when already used, in particular crumpled or wavy notes of value are stored in the first storage compartment.

It is particularly advantageous when notes of value are stored in a lying manner at least in the first storage compartment in case the value note box is positioned in a device for handling notes of value as intended. Here, a first note of value fed to the first storage compartment may rest with its front or back on the switch element. In particular, the note of value lies with its front or its back on the portion of the switch element that serves as a separating element between the first storage compartment and the second storage compartment.

Further, it is advantageous when the switch arrangement is configured and arranged such that a value note stack arranged in the first storage compartment is compressible at least in a feeding area for feeding a further note of value to the value note stack or for feeding a note of value into the first storage compartment when the switch element is moved from the second into the first position. As a result, it is guaranteed that actually that number of notes of value can be stored in the first storage compartment for which the first storage compartment has been designed. In particular, crumpled, wavy or otherwise deformed notes of value may be compressed so that the height of the value note stack is reduced and at least a feed gap for feeding a further note of value may be created.

It is particularly advantageous when the first storage compartment is arranged above the second storage compartment when the value note box is arranged in a device for handling notes of value for the intended use. As a result, an orderly value note stack may be arranged on the upper side of the switch element or on the upper side of the separating element.

Further, it is advantageous when notes of value fed to the second storage compartment via the switch unit fall into the second storage compartment in a disordered manner. As a result, it is not necessary to provide further elements for creating a value note stack in the value note box so that a compact and cost-efficient structure of the value note box is possible.

Further, it is advantageous when the switch unit has a switch lever which comprises at least one engagement element protruding through a housing of the value note box or operable from outside. As a result, it is not necessary that a drive unit for actuating the switch unit has to be provided in the value note box itself. As a result, on the one hand, costs for manufacturing the value note box may be saved and, on the other hand, the weight of the value note box compared to boxes with integrated drive unit for driving the switch unit may be reduced.

It is particularly advantageous when the switch unit comprises an elastically deformable element that exerts a force on the switch element such that it is moved into the second position or remains in the second position. Such an elastically deformable element may in particular be a tension spring, a pressure spring or an elastomer block. This guarantees that when the value note box is removed from a device for handling notes of value, the switch element is reliably arranged in the second position so that in particular notes of value may be fed via the feed slot of the value note box into the second storage compartment when the value note box has been taken from the device for storing notes of value.

It is particularly advantageous when the switch element is arranged pivotably about an axis of rotation. The axis of rotation preferably runs in the middle third of the separating element. This makes an easy pivoting of the separating element or the entire switch element possible.

Further, it is advantageous when the value note box comprises at least one vane wheel rotatable about an axis of rotation and comprising at least one elastically deformable vane for the transport of notes of value fed to the value note box into the first and/or second storage compartment. As a result, the notes of value may be moved easily within the value note box. The vanes may in particular contact an edge of the note of value and then push it into the respective storage compartment.

Further, it is advantageous when the value note box has at least one drive roller rotatable about an axis of rotation and drivable from outside, and preferably a press-on roller opposite to the drive roller. It is particularly advantageous when the drive roller and the vane wheel are arranged in a rotationally fixed manner on a shaft that is drivable from outside. As a result, a simple and compact structure as well as an easy drive of the vane wheel and the drive roller is possible. Hereby, the notes of value may be transported into the respective storage compartment easily and reliably given a corresponding switch position of the switch element.

A second aspect of the invention relates to an arrangement having a device for handling notes of value and a value note box according to claim 1 or according to one of the previously mentioned developments, wherein the device comprises a drive unit for driving the switch arrangement and/or a sensor unit for detecting the position of the switch lever and/or a drive unit for driving a vane wheel and/or a drive roller for transporting notes of value within the box. This enables an easy and reliable operation of the device with one value note box.

Further features and advantages result from the following description of embodiments as well as in connection with the enclosed figures.

Figure 1:
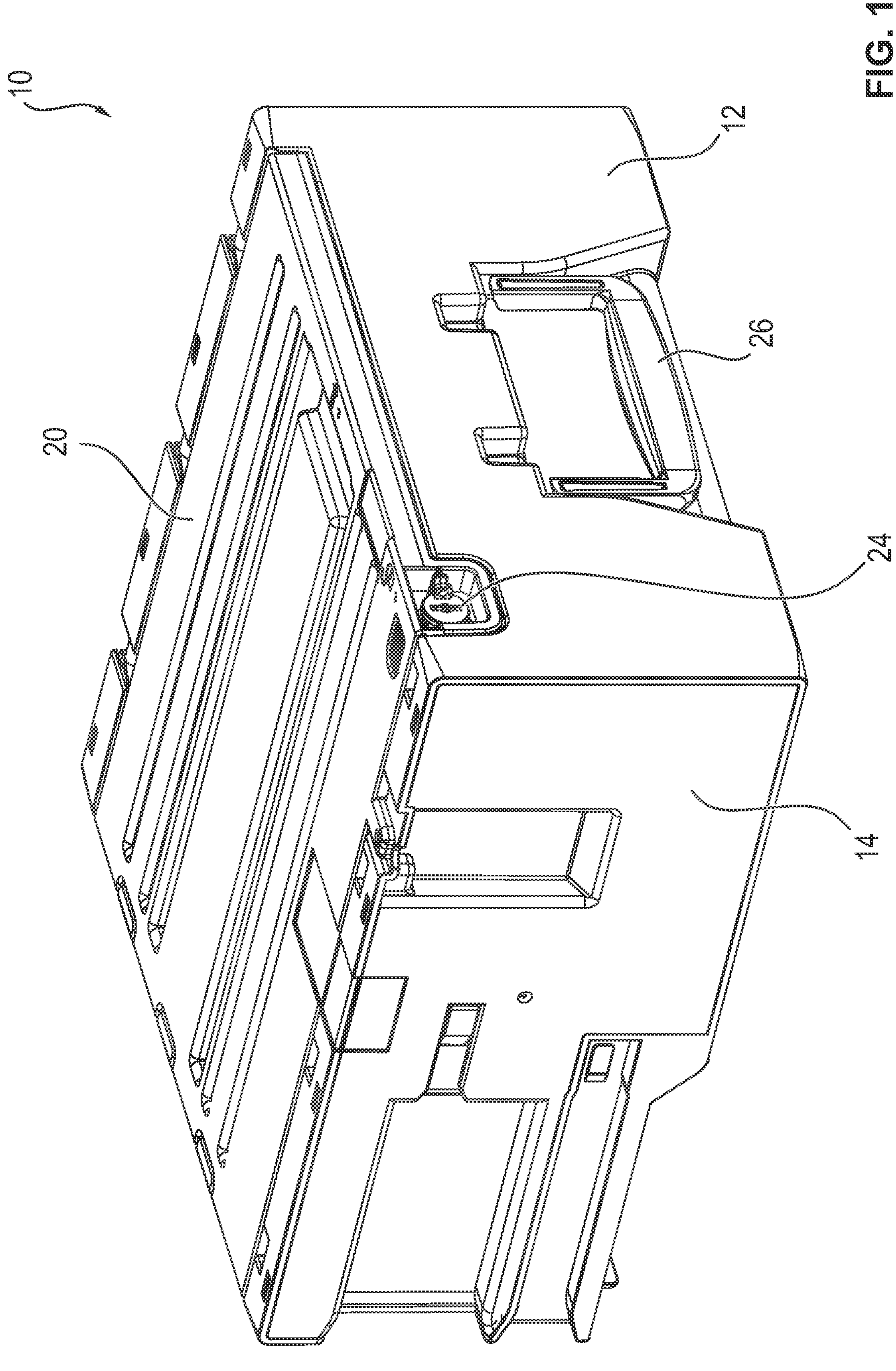
FIG. 1 shows a schematic perspective front view of a lying value note box.

FIG. 1 shows a schematic perspective front view of a lying value note box 10. In this lying position, the value note box 10 may in particular be transported. The value note box 10 is inserted in an upright position into a device for handling notes of value, such as an automated teller machine, as this will be explained in more detail hereinafter in connection with FIG. 3.

The value note box 10 has altogether six side walls 12 to 22, the side wall 20 being formed as a pivotable lid which is closable with the aid of a mechanical lock 24 in the illustrated closed position so that unauthorized people have no access to storage compartments present inside the box 10. For carrying the value note box 10 by a person, a handle 26 is provided that can be folded out from a recess in the side 12 and with the aid of which the value note box 10 may easily be carried and easily inserted in a device for handling notes of value or removed therefrom. The device for handling notes of value may in particular be an automated teller machine which may be designed as a withdrawal only automated teller machine or as a recycling automated teller machine in which banknotes may be deposited and again dispensed therefrom. In addition, the device for handling notes of value may also be an automated teller safe or an automatic POS system.

Figure 2:
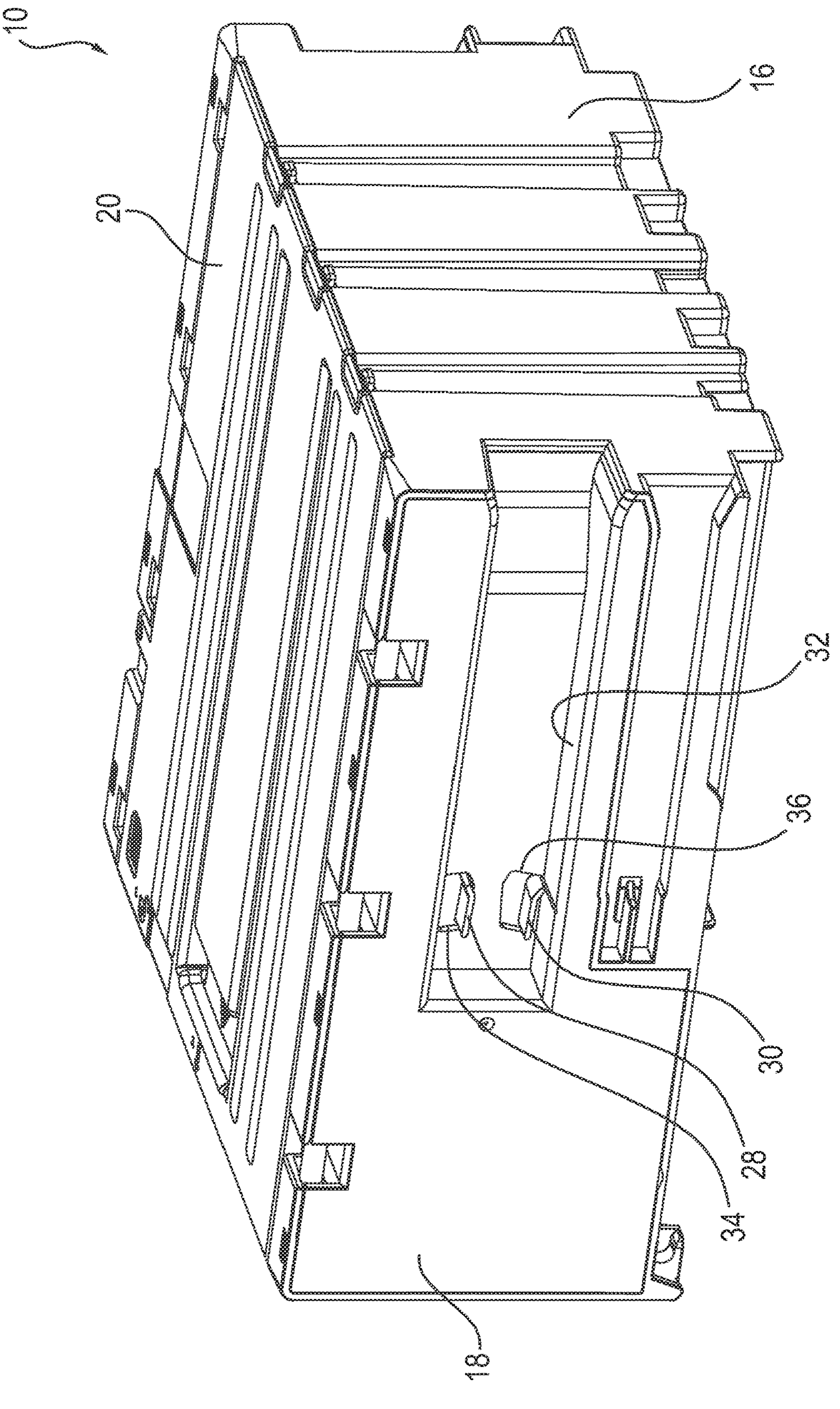
FIG. 2 shows a schematic perspective rear view of the lying value note box of FIG. 1.

FIG. 2 shows a schematic perspective rear view of the lying value note box of FIG. 1. In the side wall 18 of the value note box 10, a recess 32 is provided, in which two openings 34, 36 are present through which engagement elements 28, 30 of a non-illustrated switch lever project through the wall of the side wall 18 so that the engagement elements 28, 30 may be varied in their position when inserting the value note box 10 into the device for handling notes of value to effect a change of the switch position of a switch arranged inside the value note box 10, as this will still be explained in detail hereinafter in connection with FIGS. 4 to 6.

Figure 3:
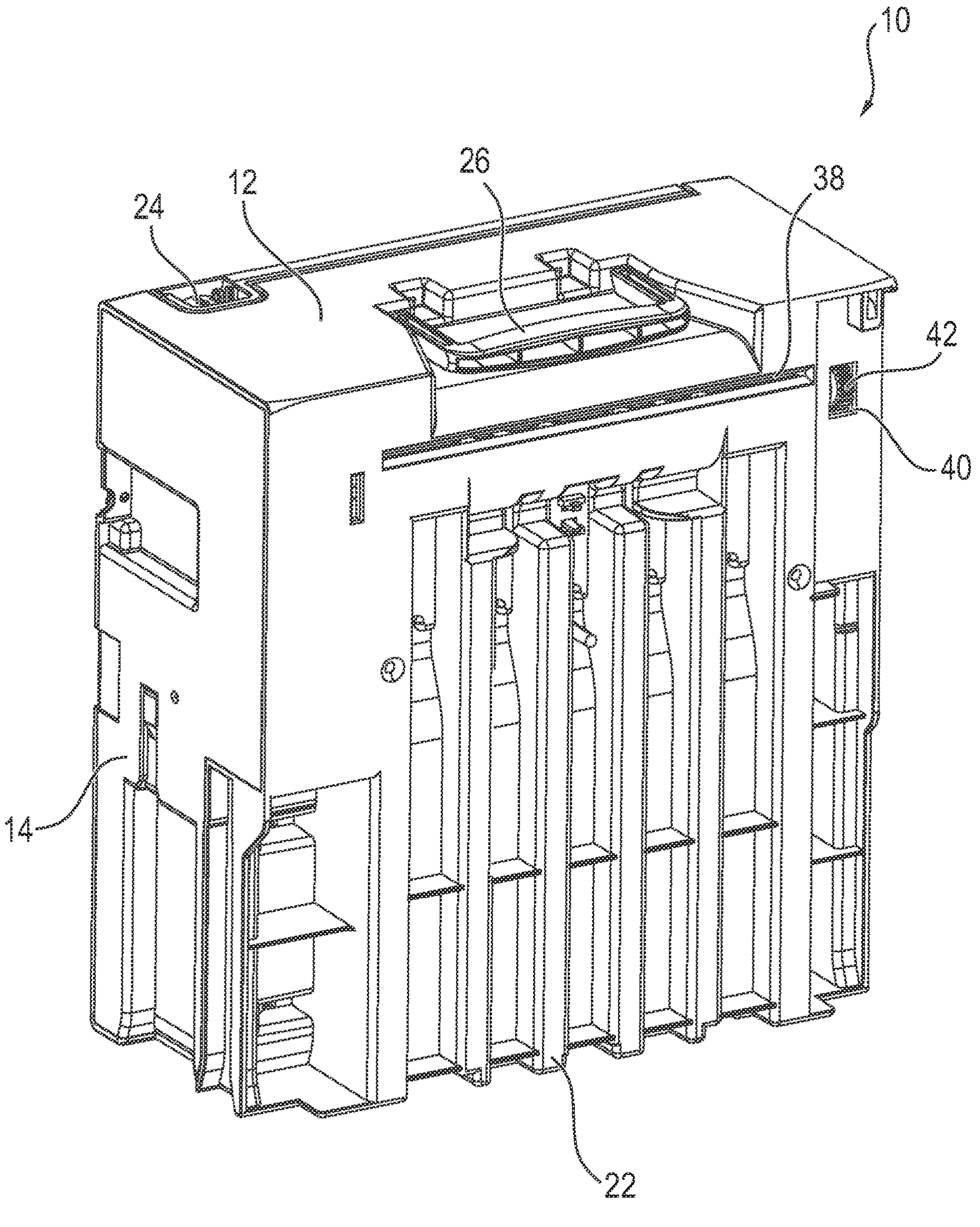
FIG. 3 shows a schematic perspective view of the value note box according to FIGS. 1 and 2 in an upright position.

FIG. 3 shows a schematic perspective view of the value note box of FIGS. 1 and 2 in an upright position. In this upright position, the value note box 10 is inserted into the device for handling notes of value. In the upper third of the side wall 22, a feed slot 38 for feeding notes of value into the value note box 10 is provided. Inside the box 10, drive elements for the transport of notes of value transported into the value note box 10 through the slot 38 into the storage compartment provided for the specific note of value are provided. The drive elements in particular comprise drive rollers and press-on rollers as well as vane wheels with elastically deformable vanes. The drive rollers and the vane wheels are arranged in a rotationally fixed manner on a shaft not illustrated in FIG. 3, which shaft is drivable via a gearwheel 42 that is contactable via an opening 40 in the side wall 22. Thus, it is possible to drive the shaft via the gearwheel 42 with the aid of a drive unit arranged outside the value note box 10. In the same manner, a drive unit for pivoting the switch lever via the engagement elements 30, 28 may be arranged outside the value note box 10 in the device for handling notes of value.

Figure 4:
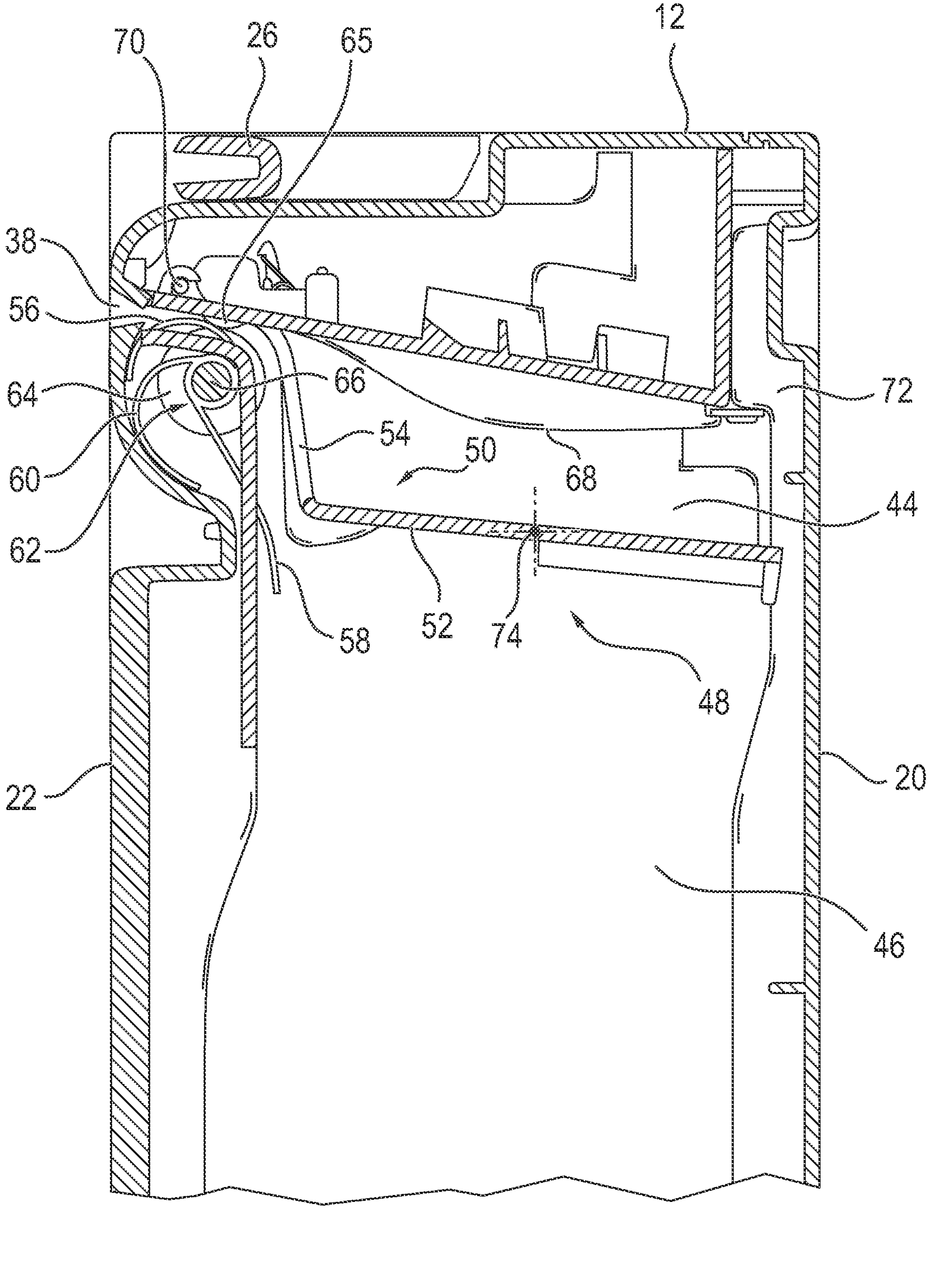
FIG. 4 shows a schematic illustration of a longitudinal section of the value note box of FIGS. 1 to 3, a switch element being arranged in a first position.

FIG. 4 shows a schematic illustration of a longitudinal section of a portion of the value note box 10. The value note box 10 comprises a first storage compartment 44 and a second storage compartment 46. The value note box 10 comprises a switch unit 48 with a switch element 50 that comprises a portion serving as a separating element 52 and switch fingers 54 for selectively feeding notes of value fed through the feed slot 38 of the value note box 10 into the first storage compartment 44 or into the second storage compartment 46. Between the switch fingers 54, the vanes 56, 58, 60 of vane wheels 62 are guided through, when the vane wheel 62 arranged on a shaft 66 in a rotationally fixed manner is rotated. The value note box 10 comprises several vane wheels 62 arranged next to each other in a spaced apart manner as well as several drive rollers 64 which are each arranged in a rotationally fixed manner on the shaft 66 next to the vane wheels 62. Opposite to the drive rollers 64, spring-mounted freely rotatable press-on rollers 65 are provided, between which a note of value fed through the feed slot 38 is transported into the first storage compartment 44 or the second storage compartment 46 depending on the position of the switch element 50. In FIG. 4, the switch element 50 is illustrated in a second switch position, in which fed notes of value are transported into the second storage compartment 46.

The vanes 56 to 60 of the vane wheel 62 are elastically deformable and contact, in addition to the drive roller 64 and the press-on roller 65, the note of value in order to transport it reliably into the respective storage compartment 44, 46. In the storage compartment 44, the notes of value are stacked on the portion 52 lying on their front or back. A guide and press-on element 68 is provided, which is pivotably mounted about an axis of rotation 70 and, due to its own weight, exerts a press-on force on the value note stack arranged in the first storage compartment 44. By means of the curved shape of the press-on element 68, a feed gap is formed in the feed area directly after passing the switch fingers 54, into which gap further notes of value to be fed may be transported and pushed under the press-on element 68. With the aid of the vanes 56 to 60 of the vane wheel 62, the notes of value are then pushed into the first storage compartment 44 up to a delimiting wall 72.

In the second switch position of the switch unit 48, which is illustrated in FIG. 4, the notes of value fed through the feed slot 38 are guided into the second storage compartment 46, the notes of value falling into the storage compartment 46 in a disordered manner.

Figure 5:
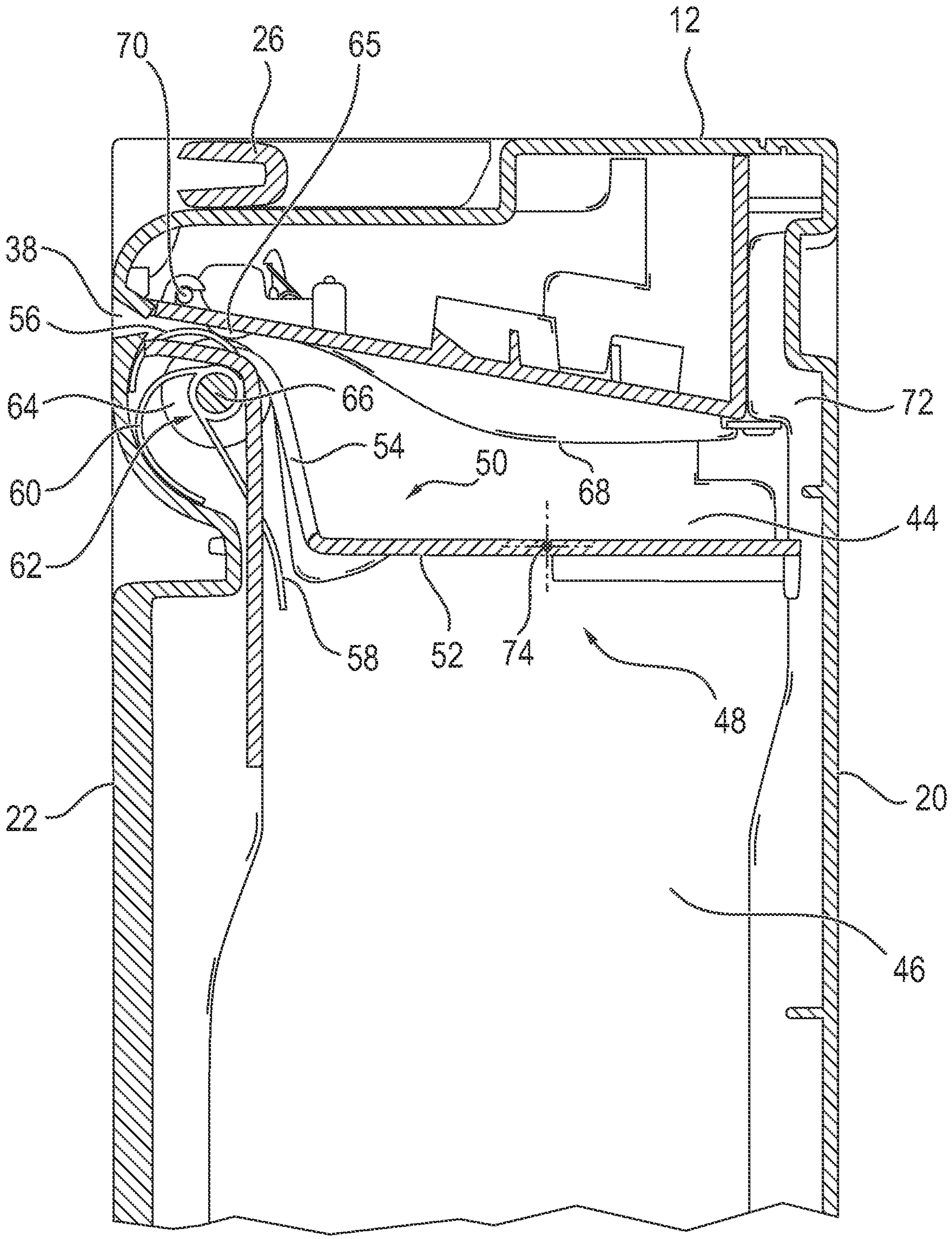
FIG. 5 shows a schematic illustration of the longitudinal section of the value note box of FIGS. 1 to 4, the switch element being arranged in a second position.

FIG. 5 shows a further schematic illustration of the longitudinal section of the value note box 10 of FIG. 4, the switch element 50 of the switch unit 48 being illustrated in a second switch position, in which the switch fingers 54 are arranged such that the notes of value fed to the value note box 10 via the feed slot 38 reach the first storage compartment 44. The entire switch element 50 is pivoted via a non-illustrated switch lever about an axis of rotation 74 from the first position of FIG. 4 into the second position of FIG. 5.

An elastically deformable element, in particular a spring, is provided that leaves the engagement elements 28, 30 in the first position of the switch element 50 illustrated in FIG. 4 or moves them into the first switch position without a drive unit arranged outside the box 10 in a device for handling notes of value exerting a force on the engagement elements 28, 30. The drive rollers 64 and/or the press-on rollers 68 are made of electrically conductive plastic material and are preferably contacted by electrically conductive brushes for discharging electrical charge. As a result, an electrostatic charging of the rollers 64, 68 is prevented so that a safe transport of the notes of value fed through the feed slot 38 into the first storage compartment 44 or into the second storage compartment 46 is possible.

Figure 6:
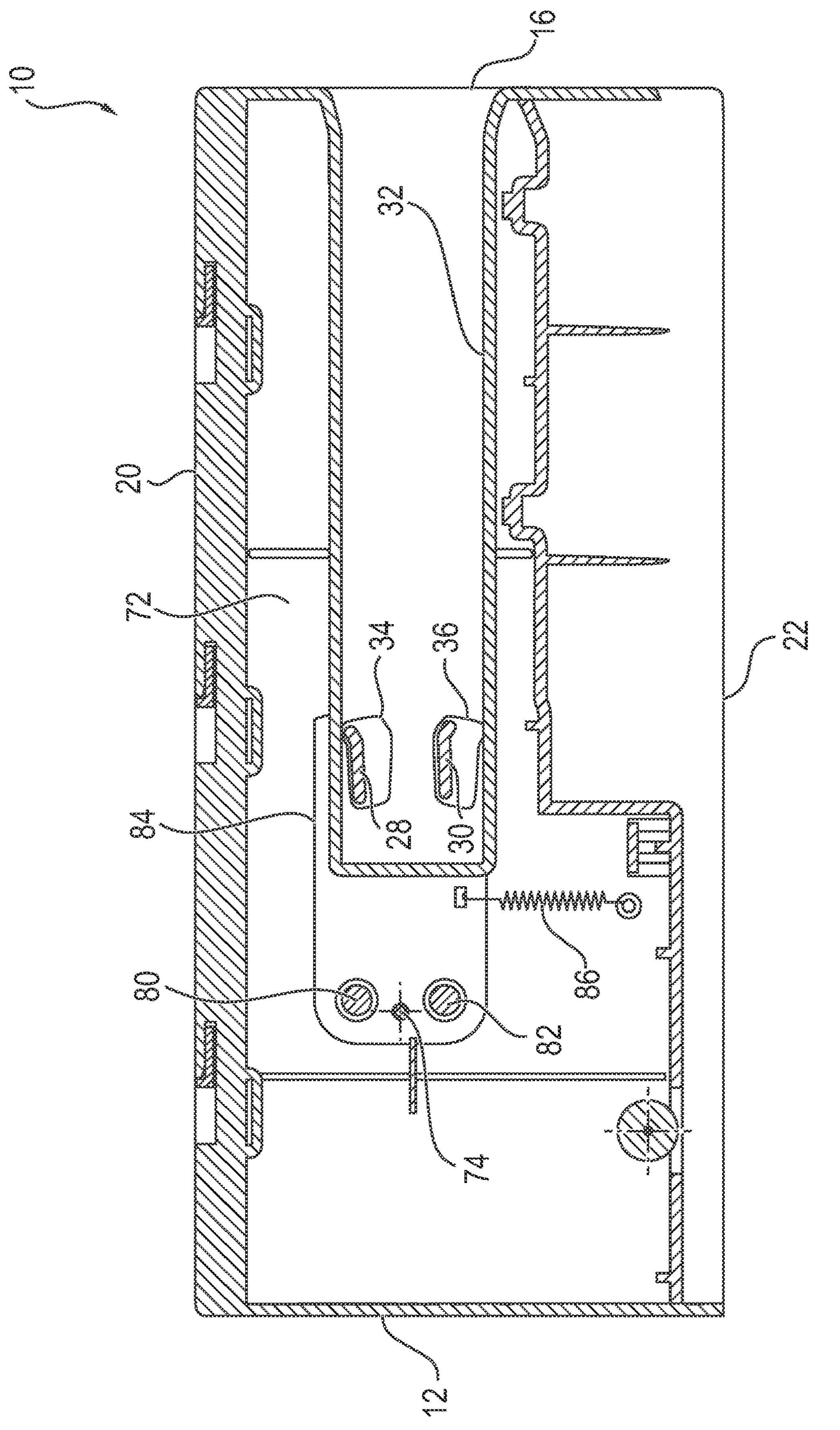
FIG. 6 shows a schematic illustration of a further longitudinal section of the value note box.

FIG. 6 shows a schematic illustration of a further longitudinal section of the value note box 10. This longitudinal section extends in the area of the recess 32 so that both the lateral delimiting walls of the recess 32 and the engagement elements 30, 28 are illustrated sectionally. In FIG. 6, a switch lever 84 connected to the switch element 50 via screws 80, 82 is visible, the switch lever being pivotable about the pivot axis 74. In the present embodiment, the switch lever is connected to the housing of the value note box 10 via a tension spring 86 so that the switch lever 84 is moved from the first position of the switch lever 84 illustrated in FIG. 6 and in which the switch element 50 is in the first position into a second position in which the switch element 50 is in the second switch position.

The value note box 10 is accommodated in a receptacle or in a rack of a device for handling notes of value in the position illustrated in FIG. 3. For this, the value note box 10 is inserted into a receptacle from above so that an eccentric drivable with the aid of a stepper motor is inserted between the engagement elements 28, 30 of the switch lever 84. The position of the eccentric is exactly determined via two light barrier arrangements so that a control unit of the device for handling notes of value may detect the exact position of the eccentric and thus the exact position of the switch element 50. The engagement elements 28, 30 are formed as skids, between which the eccentric is inserted when placing the value note box 10 in the device for handling notes of value.

As shown in particular in FIGS. 4 and 5, the portion 52 of the switch element 50 serves as a deposit surface for notes of value fed to the first storage compartment 44. The fed notes of value are thus deposited and stacked on the portion 52 of the switch element 50. By depositing the notes of value on the switch element 50 and the use of the switch element 50 as a separating wall between the first storage compartment 44 and the second storage compartment 46, a very compact structure of the value note box 10 is achieved.

LIST OF REFERENCE SIGNS

10 value note box
12 to 22 side walls of the housing of the value note box
24 lock
26 handle
28, 30 engagement elements
32 recess
34, 36 opening
38 feed slot
40 opening
42 gearwheel
44 first storage compartment

46 second storage compartment
48 switch unit
50 switch element
52 portion of the switch element
54 finger of the switch element
56, 58, 60 deformable vane
62 vane wheel
64 drive roller
65 press-on roller
66 shaft
68 press-on lever
70 pivot axis
72 side wall
74 axis of rotation
80, 82 screws
84 switch lever
86 tension spring

The invention claimed is:

1. A value note box comprising:

a housing;

a first storage compartment within said housing for storing notes of value;

a second storage compartment within said housing for storing notes of value;

a switch unit configured to selectively feed notes of value into the first storage compartment or into the second storage compartment, and comprising:

a switch element moveable between a first position wherein notes of value are fed to the first storage compartment and a second position wherein notes of value are fed to the second storage compartment, the switch element having a portion delimiting at least one side of the first storage compartment, and also having a switch lever with at least one engagement element protruding through said housing to an outside of said housing;

wherein a portion of the switch element serves as a separating element between the first storage compartment and the second storage compartment, and the switch element is pivotable about an axis of rotation through the separating element; and wherein when the switch element is in the second position the first storage compartment is smaller than when the switch element is in the first position.

2. A value note box comprising:

a housing;

a first storage compartment within said housing for storing notes of value;

a second storage compartment within said housing for storing notes of value;

a switch unit configured to selectively feed notes of value into the first storage compartment or into the second storage compartment, and comprising:

a switch element moveable between a first position wherein notes of value are fed to the first storage compartment and a second position wherein notes of value are fed to the second storage compartment, the switch element having a portion delimiting at least one side of the first storage compartment, and also having a switch lever with at least one engagement element protruding through said housing to an outside of said housing;

wherein a portion of the switch element serves as a separating element between the first storage compartment and the second storage compartment, and the switch element is pivotable about an axis of rotation through the separating element; and at least one vane wheel which is rotatable about an other axis of rotation and with at least one elastically deformable vane for the transport of notes of value fed to the housing into the first and second storage compartments.

3. The value note box of claim 2 further comprising:

at least one drive roller rotatable about the other axis of rotation and drivable from outside of the housing; and a press-on roller opposite to the drive roller.

4. The value note box according to claim 3, wherein the at least one drive roller and the at least one vane wheel are arranged in a rotationally fixed manner on a shaft drivable from outside of the housing.

* * * * *